Sept. 28, 1943. H. ORNER 2,330,374
POWER TRANSMISSION
Filed July 18, 1940 8 Sheets-Sheet 4
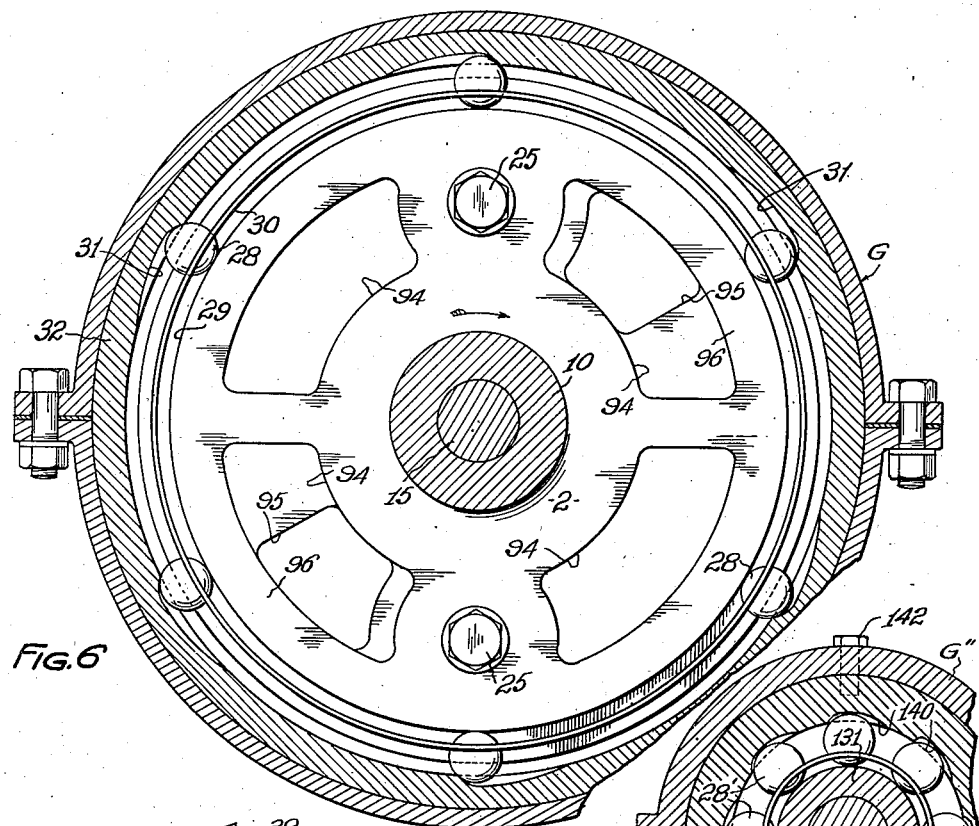
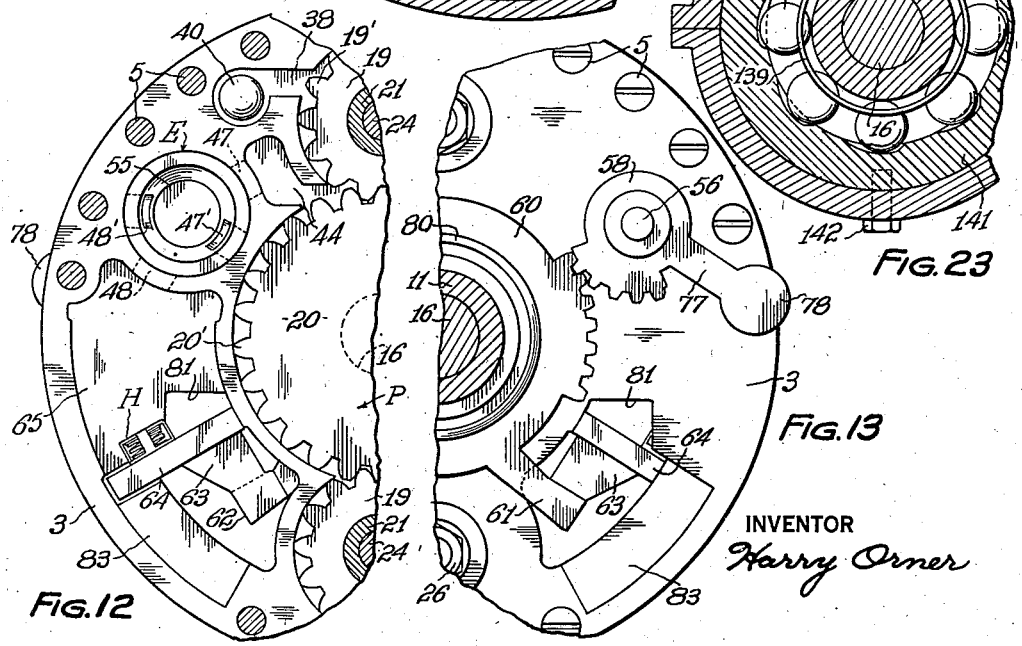
INVENTOR
Harry Orner

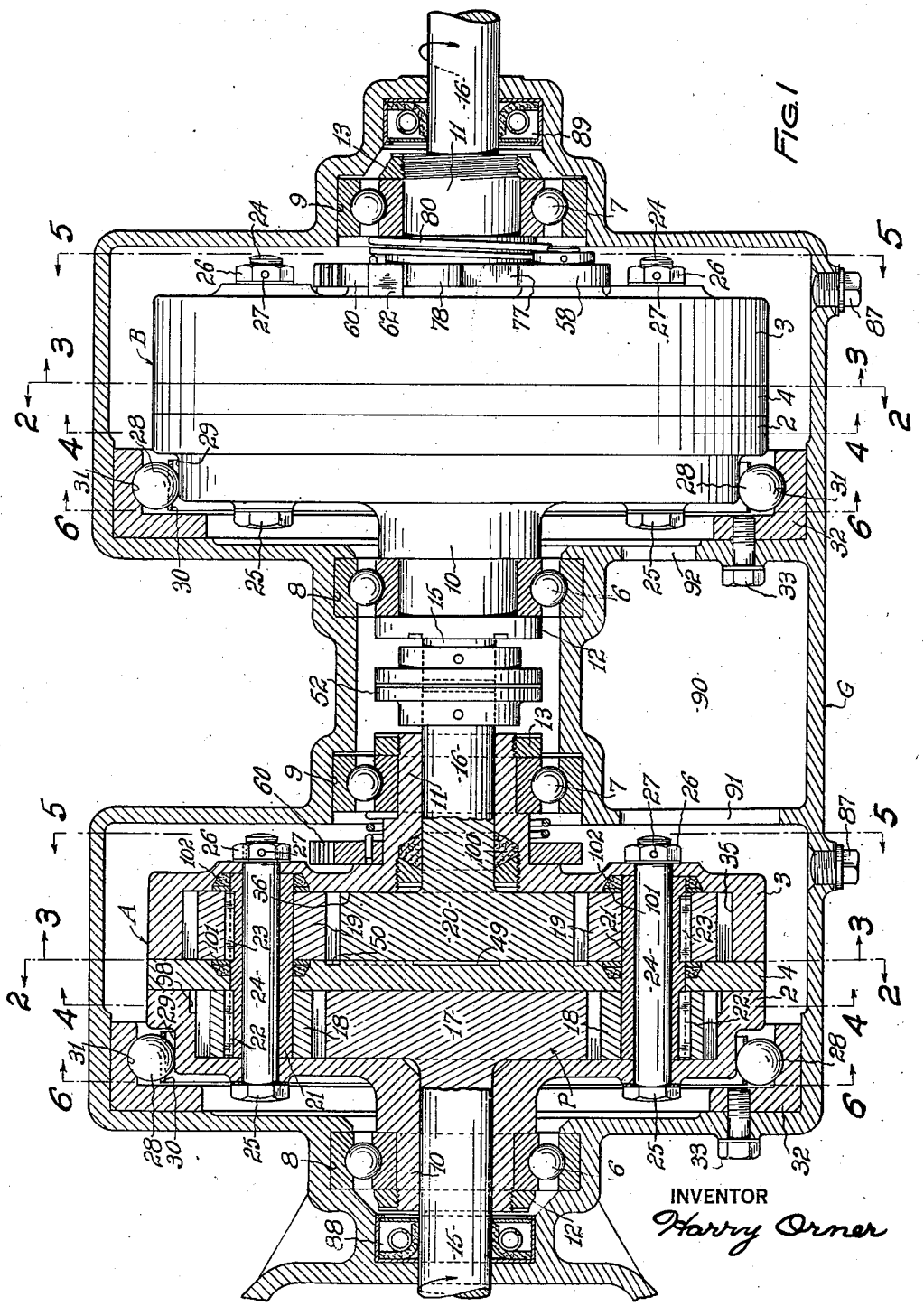

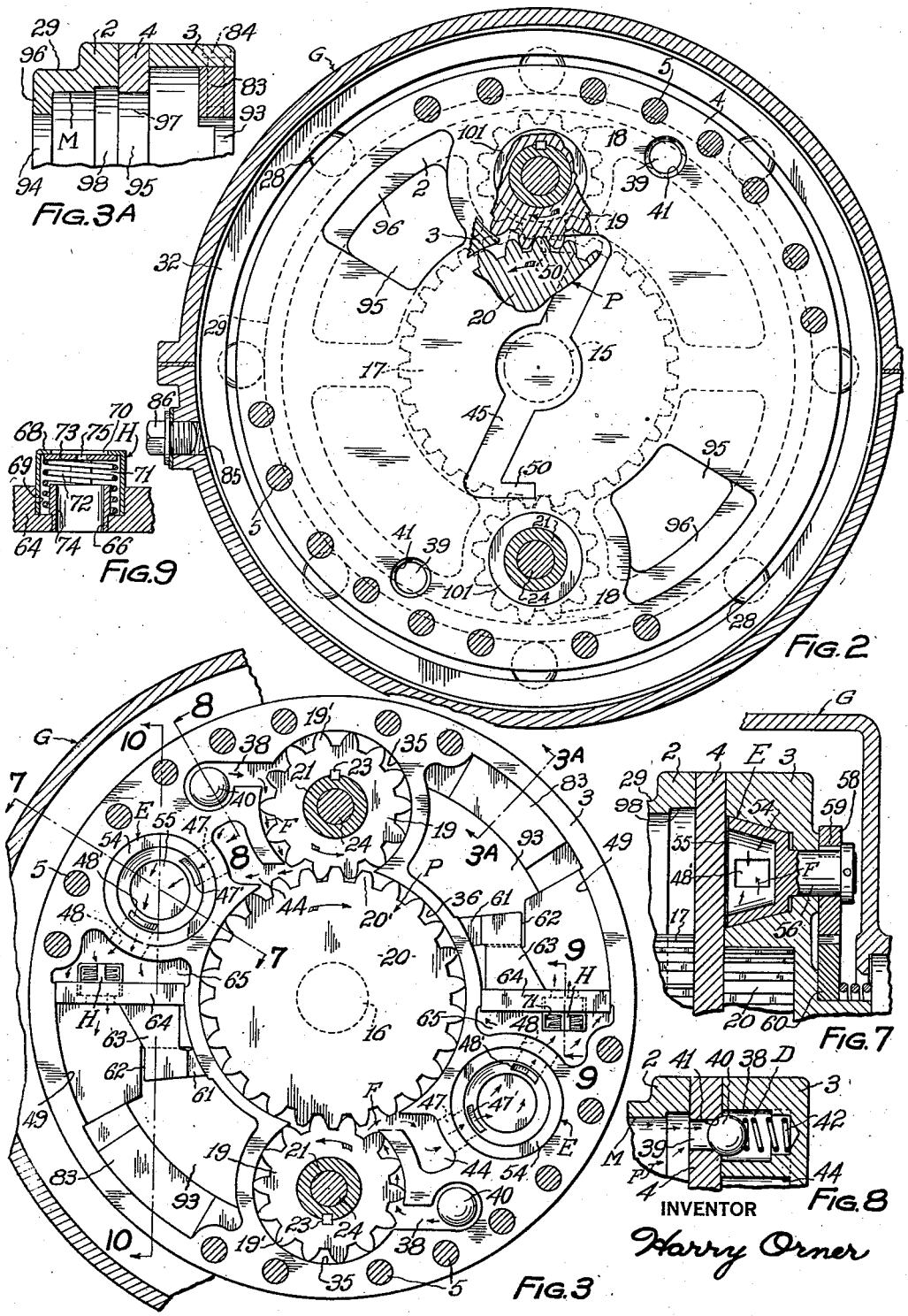

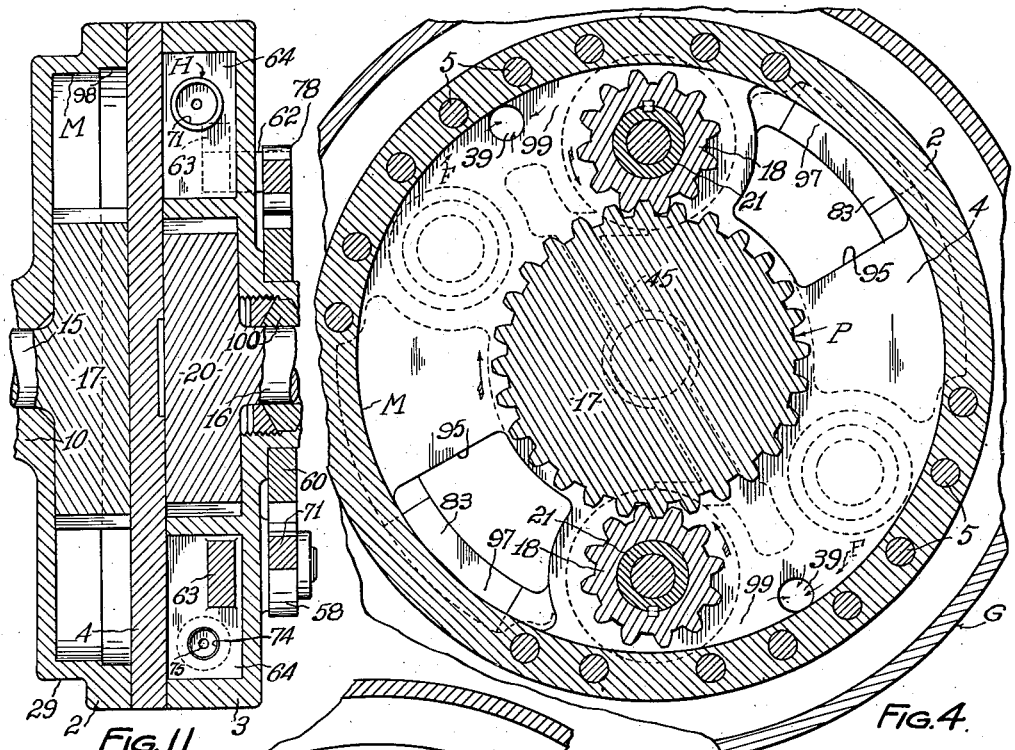
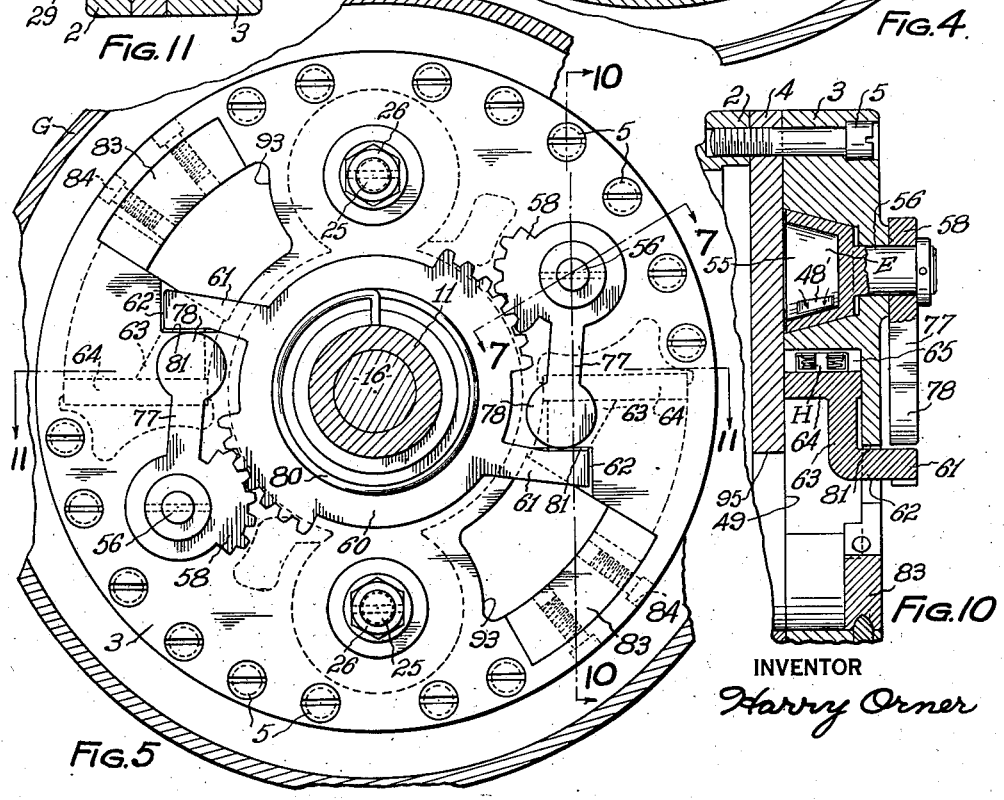

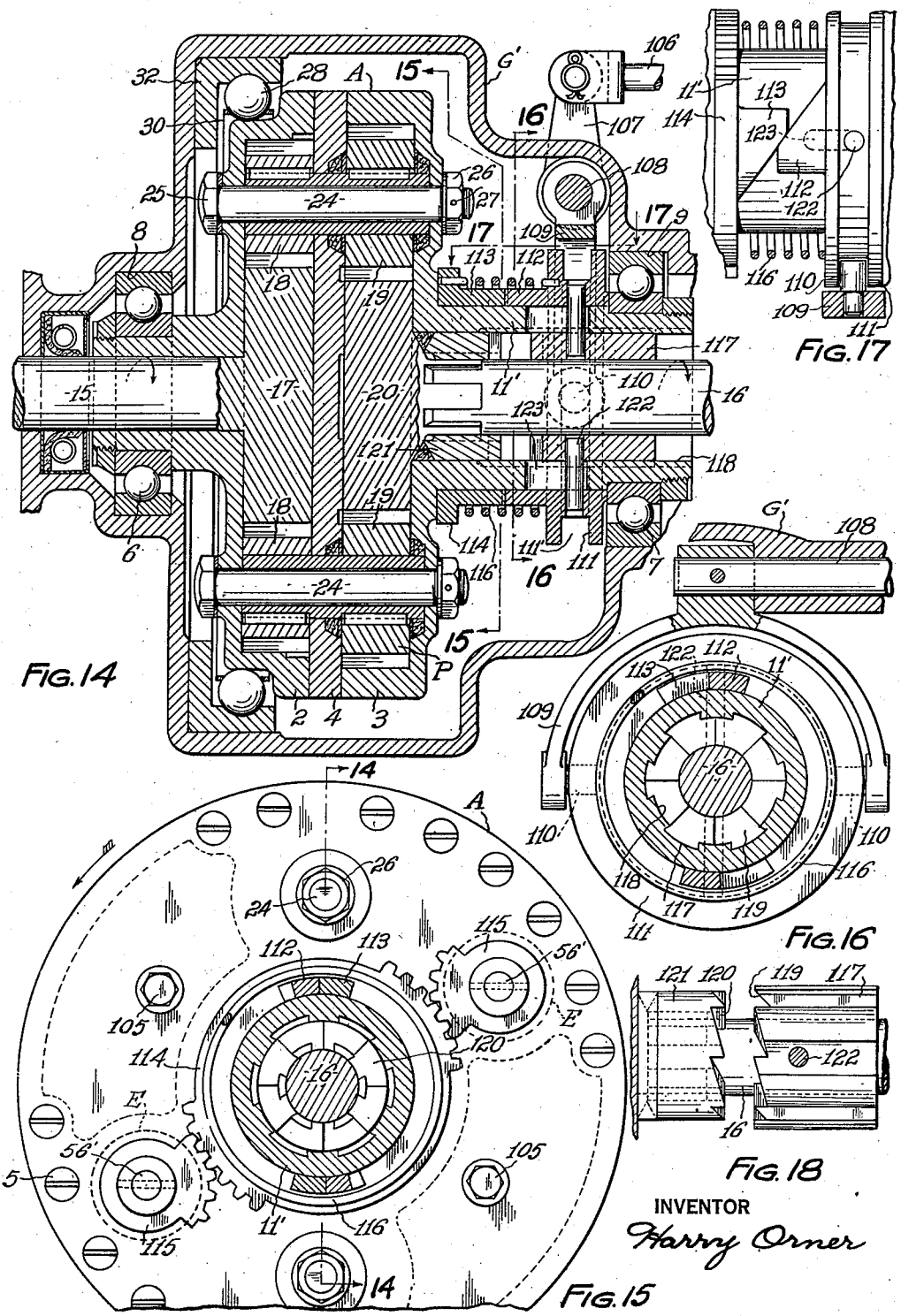

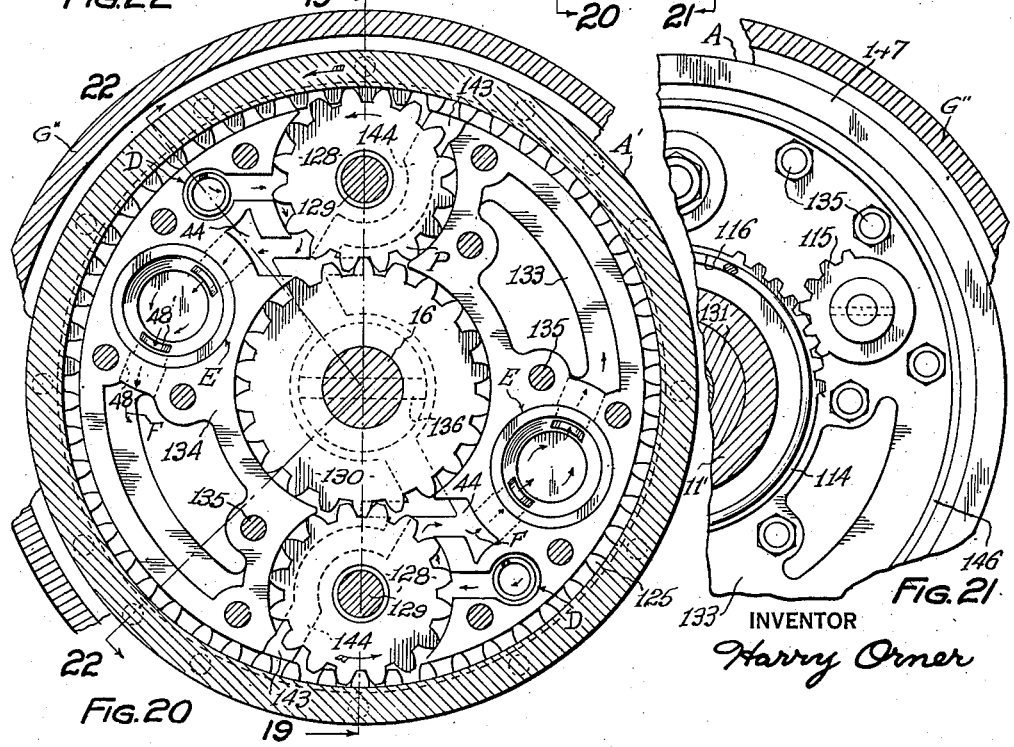

Sept. 28, 1943.  H. ORNER  2,330,374
POWER TRANSMISSION
Filed July 18, 1940  8 Sheets-Sheet 7

INVENTOR
Harry Orner

INVENTOR
Harry Orner

Patented Sept. 28, 1943

2,330,374

UNITED STATES PATENT OFFICE 2,330,374

POWER TRANSMISSION

Harry Orner, Cleveland Heights, Ohio

Application July 18, 1940, Serial No. 346,172

32 Claims. (Cl. 74—294)

This invention relates to power transmissions, and particularly to planetary transmissions connected for power transmission at all times between a power source and a driven load, and which automatically vary the speed ratio of transmission.

The invention is particularly applicable to the driving of loads having considerable inertia, to accelerate or slow down the load by a rotating power source such as an internal combustion engine or electric motor; and to cases in which it is desired to have the speed of the load increase or decrease respectively as the torque of the load decreases or increases, below or above a normal torque; and the invention comprises means by which changes in the speed of the load are effected by a transmission the speed ratio of which varies automatically.

One object of my invention is to provide a transmission unit by which a load may be driven through a constantly meshed gear reduction unit until the load has been accelerated to a desired speed and by which the gear reduction is then automatically and gradually removed and the load driven at the speed required for normal work at less gear reduction or no gear reduction, and by which such change of reduction is effected smoothly and uninterruptedly;

Another object of my invention is to provide an improved transmission comprising a planetary gear train for transmitting power at a definite reduction gear ratio, and comprising means to change over to direct drive by retarding the rotation of the planetary gear train using for this purpose a brake on the gears of the planetary gear train;

Another object of my invention is to provide improved means to change the transmission of power through a planetary gear train from rotary motion of the gears of the train to rotary motion of the planetary gear train as a locked unit or vice versa;

Another object of my invention is to provide a direct mechanical connection between the drive and driven shafts of a variable ratio transmission which can be effected at that instant at which the drive and driven members approach equal speeds of rotation;

Another object is to provide an improved brake for the gears of a planetary gear train to vary the ratio of transmission therethrough;

Another object is to provide a planetary gear transmission having brake means for varying the ratio of transmission and improved means for variably automatically applying the brake means;

Another object is to provide an improved transmission characterized by simplicity of parts and action, and admitting of being embodied in a compact unit at low cost;

Another object is to provide a mechanism which may be disposed between a source of power and a load to function as a variable speed-ratio power transmission to drive the load; or as a clutch to cushioningly connect the load to the source; or as a brake to cushioningly retard the load.

Other objects of my invention will become apparent from the following detailed description of embodiments thereof illustrated in the accompanying drawings and particularly pointed out in the claims, such disclosed means being merely illustrative of the various mechanical forms in which the principle of the invention may be used.

In said accompanying drawings:

Fig. 1 is a longitudinal, sectional view of an embodiment of my invention and showing two similar units, one in elevation and one in section approximately through a rotational axis;

Fig. 2 is a sectional view taken from the plane 2—2 of Fig. 1, showing a center plate construction;

Fig. 3 is a sectional view taken from the plane 3—3 of Fig. 1 showing part of a planetary gear train, and valves, and chamber arrangements and other parts of Fig. 1;

Fig. 3A is a fragmentary sectional view taken from the plane 3A—3A of Fig. 3;

Fig. 4 is a sectional view taken from the plane 4—4 of Fig. 1 showing another part of the planetary gear train and relative parts of that figure;

Fig. 5 is a sectional view taken from the plane 5—5 of Fig. 1 showing part of a valve operating mechanism and relative parts;

Fig. 6 is a sectional view taken from the plane 6—6 of Fig. 1 showing a one-directional braking mechanism and relative parts;

Fig. 7 is a sectional view taken from the plane 7—7 of Fig. 3 and Fig. 5 showing valves and operating means;

Fig. 8 is a sectional view taken from the plane 8—8 of Fig. 3 and Fig. 5 showing an inlet valve;

Fig. 9 is a sectional view taken from the plane 9—9 of Fig. 3, showing part of a valve operating means;

Fig. 10 is a sectional view taken from the plane 10—10 of Fig. 3 and Fig. 5 showing a valve and relative parts;

Fig. 11 is a horizontal sectional view taken from the plane 11—11 of Fig. 5 showing sun gears of a planetary gear train, a valve arrangement and relative parts;

Fig. 12 is a fragmentary view similar to Fig. 3 showing a valve and relative parts in full open position;

Fig. 13 is a fragmentary view similar to Fig. 5 showing the valve operating mechanism in the same relative position as in Fig. 12;

Figure 25:
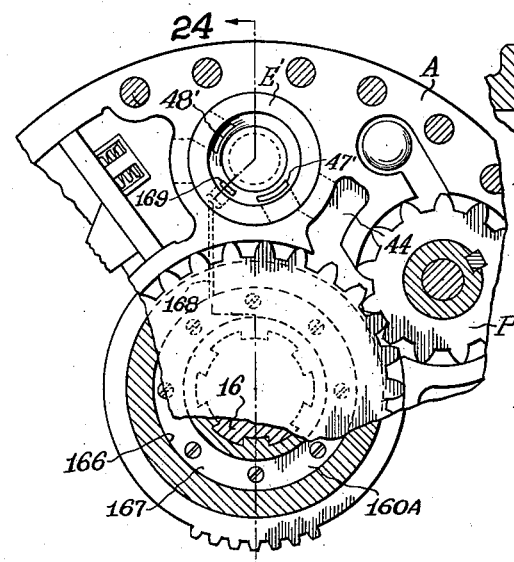
Figure 24:
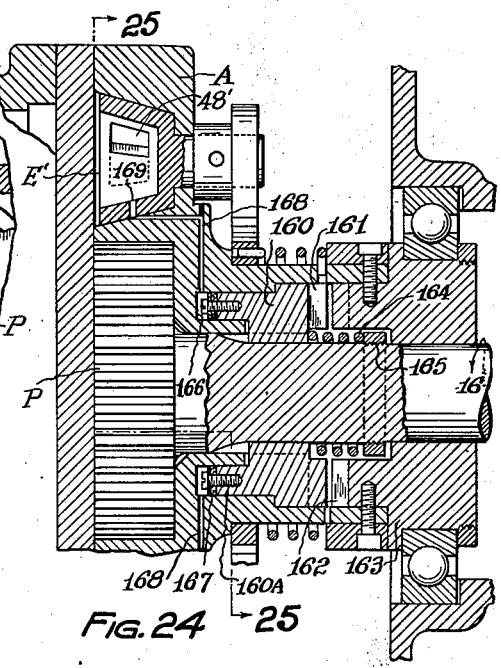
Figure 27:
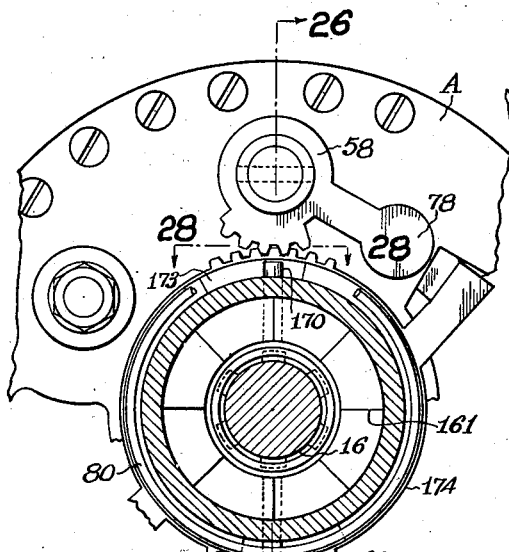
Figure 26:
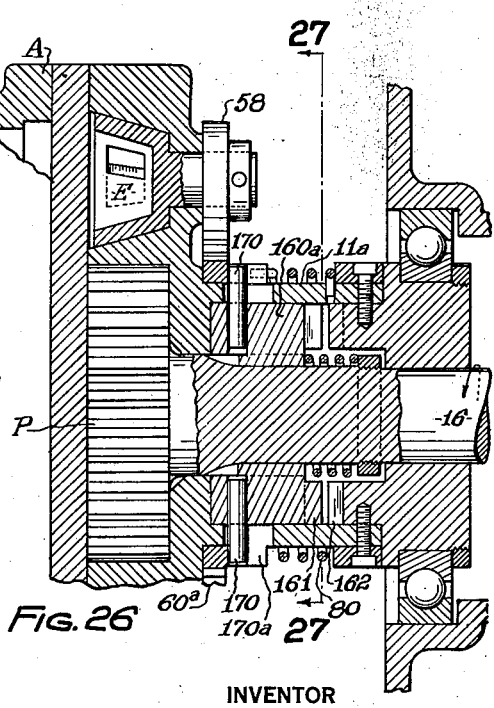
Figure 28:
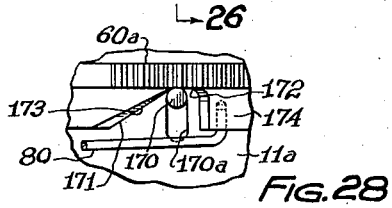
Figure 29:
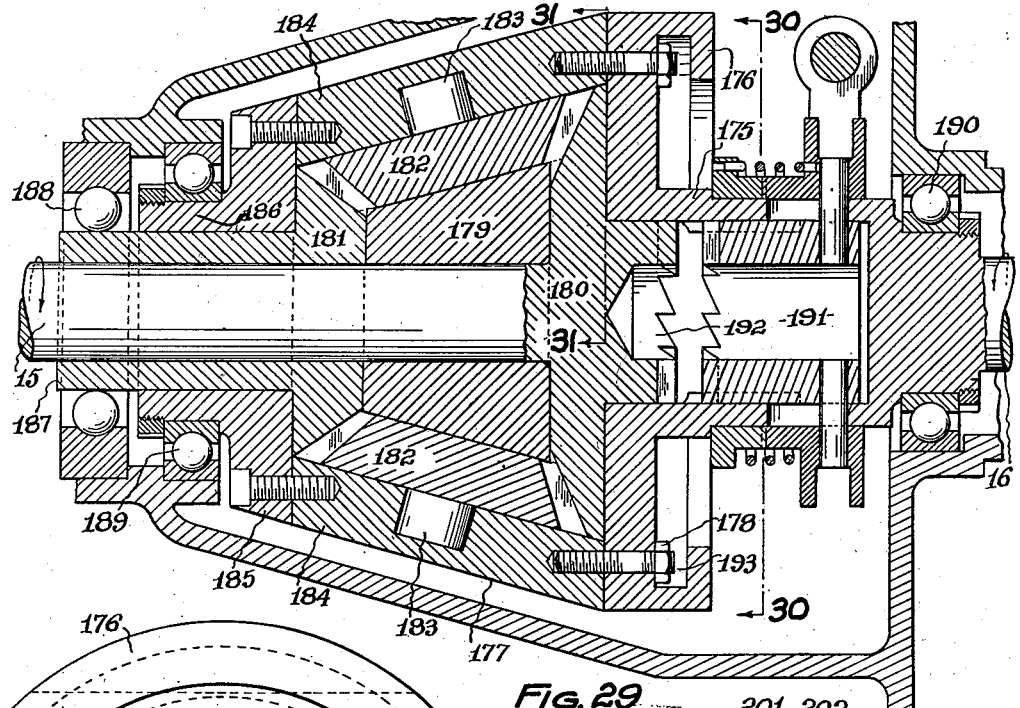
Figure 30:
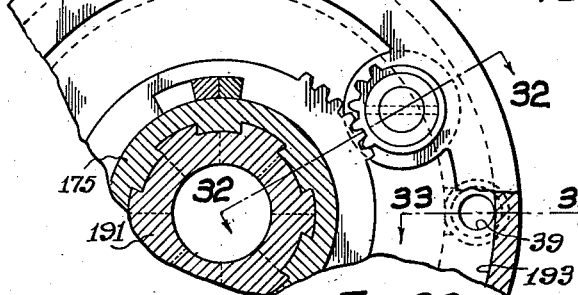
Figure 32:
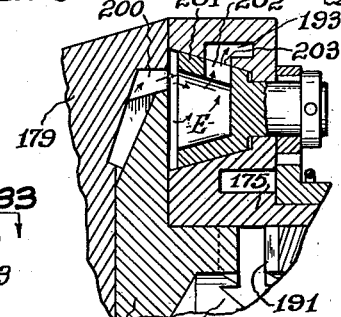
Figure 31:
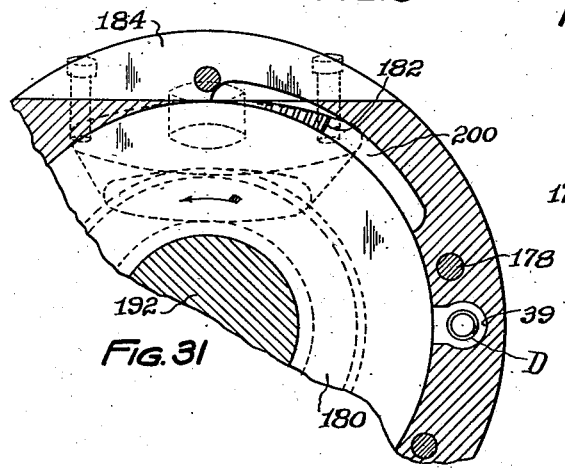
Figure 33:
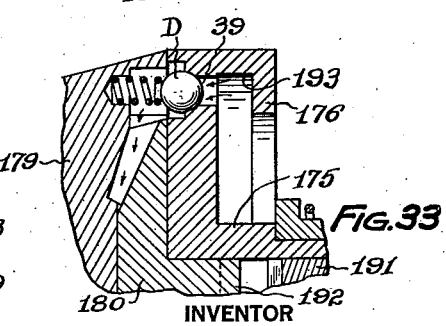

Figs. 14 to 18 inclusive illustrate another embodiment of my invention similar to that of Figs. 1 to 13, but manually operated and having mechanical direct drive locking means;

Fig. 14 is a longitudinal sectional view of a unit of the embodiment of Figs. 14 to 18 taken from the plane 14—14 of Fig. 15;

Fig. 15 is a sectional view taken from the plane 15—15 of Fig. 14 showing part of a valve operating construction and relative parts;

Fig. 16 is a sectional view taken from the plane 16—16 of Fig. 14 showing manual valve operating means and relative parts;

Fig. 17 is a horizontal sectional view taken from the plane 17—17 of Fig. 14 showing a cam mechanism and relative parts;

Fig. 18 is a detached view of jaw clutches of the mechanical direct drive locking means;

Figs. 19 to 23 inclusive are views illustrating another embodiment of my invention but different from the foregoing in the respect that an internal ring gear is used in the planetary gear train;

Fig. 19 is a longitudinal sectional view of a transmission unit taken from the plane 19—19 of Fig. 20;

Fig. 20 is a sectional view taken from the plane 20—20 of Fig. 19 showing a planetary gear train and valve arrangement;

Fig. 21 is a fragmentary sectional view taken from the plane 21—21 of Fig. 19 showing a valve control construction and relative parts;

Fig. 22 is a sectional view taken from the plane 22—22 of Fig. 20 showing an intake valve and relative parts;

Fig. 23 is a sectional view taken from the plane 23—23 of Fig. 20 showing a one directional braking mechanism and relative parts;

Fig. 24 is a view similar to Fig. 4 illustrating a modification;

Fig. 25 is a fragmentary sectional view taken from the plane 25—25 of Fig. 24;

Fig. 26 is a view similar to Fig. 14 illustrating another modification;

Fig. 27 is a fragmentary view taken from the plane 27—27 of Fig. 26;

Fig. 28 is a fragmentary view taken from the plane 28—28 of Fig. 26;

Fig. 29 is a longitudinal sectional view similar to Fig. 14 illustrating another modification;

Fig. 30 is a fragmentary view taken from the plane 30—30 of Fig. 29;

Fig. 31 is a fragmentary view taken from the plane 31—31 of Fig. 29;

Fig. 32 is a fragmentary view taken from the plane 32—32 of Fig. 30;

Fig. 33 is a fragmentary view taken from the plane 33—33 of Fig. 30.

Referring first to Figs. 1 to 13 inclusive which illustrate one embodiment of my invention, in Fig. 1, is a rotor housing A shown in section and on a common axis with a similar rotor housing B shown in elevation, both rotatably supported in a general housing G. Rotor housings A and B being similar in structure, it will be sufficient to describe rotor housing A in detail.

The rotor housing A, as illustrated in Fig. 1, is composed of two cup-form sections 2 and 3 and a center plate 4, fastened together by bolts 5 (see Fig. 10) forming a hollow cylindrical rotor housing A, rotatably supported at its axis by anti-friction bearings 6 and 7 respectively mounted in apertures 8 and 9 of general housing G. Rotor housing sections 2 and 3 have axially extending hubs 10 and 11 respectively, so machined as to fit into the inner races of the anti-friction bearings 6 and 7 respectively, and retained therein by threaded collars 12 and 13 respectively, on threaded ends of the hubs 10 and 11.

A driven shaft 15 is journaled in the hub 10 coaxial with the rotor housing A, and a drive shaft 16 is similarly journaled in the hub 11 on the same axis as driven shaft 15.

Contained within the rotor housing A is a differential gearing P, preferably of the planetary class, and comprising a sun gear 17 in constant mesh with one or more planet gears 18, rotatable on the same axes as, and rigidly connected to, a similar number of planet gears 19. Planet gears 19 are in constant mesh with a second and smaller sun gear 20. Sun gear 17 is integral with or connected to the rotatable driven shaft 15, and sun gear 20 is integral with or connected to the rotatable drive shaft 16.

Planet gears 18 and 19 are mounted on hollow shafts 21 and secured thereto by keys 22 and 23 respectively. The hollow shafts 21 are rotatable on stationary shafts 24 fixed into rotor housing A, each shaft 24 passing through the rotor housing sections 2 and 3, and through the center plate 4, and having a head 25 on one side, and fastened by a nut 26 on the opposite side, and a pin 27 locking the nut 26 on shaft 24. The rotor housing constitutes a pinion-carrier for the planet gears 18 and 19.

Rotary motion supplied by a source of power to turn drive shaft 16 in a clockwise direction as viewed from the left end, tends to turn driven shaft 15 in a similar direction, motion being transmitted by planetary gear train P. In this illustrative instance because of the difference in pitch diameter of the sun gears 17 and 20, the planetary gear train P transmits motion at a reduction gear ratio to driven shaft 15 from drive shaft 16 and at a proportionally increased torque. With drive shaft 16 rotating in the clockwise direction and driven shaft 15 having a load or torque resistance, if the rotor housing A were free to rotate on bearings 6 and 7 it would rotate in the counter-clockwise direction, and this is undesirable, and to overcome this I use a one-way brake to permit planetary gear train P to turn in the clockwise direction only.

As illustated in Fig. 6, a plurality of steel balls 28, are equally distributed on the circumference of a machined annular ledge 29 of the rotor housing A, and retained equally spaced by a retaining ring 30, having holes therein for the balls 20 to rotate freely. Balls 28 fit into cam grooves 31 on the inside circumference of a ring 32, ring 32 being fastened to general housing G by bolts 33. These cam grooves 31 are so formed as to have a clearance with the balls 28 and ledge 29, to permit free rotation of rotor housing A in the clockwise direction, but this clearance decreases, because of the selected slope of the cam grooves 31, when the rotor housing A tends to rotate in the counter-clockwise direction, and the balls become locked in place. It will thus be seen that a type of pawl and ratchet element is here disclosed, the ball corresponding to the usual pawl, but that these parts are always in engagement and the noise and wear of ordinary pawl and toothed ratchet, where the pawl clicks over the teeth in one direction, is avoided.

According to the above construction, when rotary power is transmitted from the drive shaft 16 through the planetary reduction gear train P to the driven shaft 15 and the latter has torque resistance, the driven shaft 15 is rotated at reduced speed and proportionally increased torque. The torque resistance on the driven shaft 15 to be overcome, will determine the proper planetary gear reduction to be provided to correspond with the particular machine to be driven and the source of rotary power. When the torque resistance has been overcome and the load rotates at the reduction speed ratio, means is provided to gradually effect a direct drive from the drive shaft 16 to driven shaft 15 by slowing down and finally stopping rotation of the planet gears 18 and 19 on their axes, and causing revolution of the axes in unison with the sun gears 17 and 20; and rotary motion of drive shaft 16 is thereafter transmitted in a direct drive, to driven shaft 15; and this means will now be described.

The planetary gear train P contained within rotor housing A consisting of the sun gear 20 in constant mesh with the plurality of equally spaced planet gears 19 (two planet gears being illustrated in Fig. 3), has a running fit within machined apertures, 35 for the planet gears 19, and 36 for the sun gear 20, and enclosed by the center plate 4 which constitutes a transverse aperture wall. This fit is close enough to be liquid tight for liquid such as oil, to be referred to, and to permit little or no escape of such liquid between the walls of the apertures, the center plate and the enclosed gears. It is to be understood that a "fit" in this instance may be either a simple metal to metal fit, or may be any of the more compound fits such as are provided by rings or packing (not shown) to suit the conditions for which this invention is intended to be used, as will become apparent.

Referring to Fig. 3, inlet channels 38 are provided, starting from holes 39 in center plate 4, see Fig. 8, and terminating on the peripheral walls of the apertures 35. In certain circumstances, a one-way valve D may be desired in channels 38, and a suitable type comprises a ball 40 seated on a machine surface 41 concentric with hole 39, and a spring 42 abutting upon the housing section 3 and upon ball 40, and of such tension as to permit a free flow of liquid into channels 38 but to cause the ball 40 to seat on the machine surface 41 conforming to the ball 40 and prevent the flow of liquid out of the channels 38.

Teeth 19' on planet gears 19 mesh with teeth 20' on sun gear 20, see Fig. 3. On the side where teeth 19' and 20' move toward each other to intermesh, are pressure chambers 44, these pressure chambers 44 being connected together to equalize pressure therein, and in the instant embodiment this is effected by a diagonal groove 45 in center plate 4, see Fig. 2. Valve arrangements, indicated generally at E, are connected by orifices 47 in rotor housing A, to pressure chambers 44; and similar orifices 48 lead from valves E to an arc-shaped cavity 49 formed in rotor housing section 3 and center plate 4. Liquid, indicated by the direction of its flow by arrows F, see Fig. 3, enters the holes 39 in center plate 4, passes the balls 40 of the one-way valve D, see Fig. 8, flows through the channels 38 into the apertures 35 and is carried, by the spaces between the teeth 19' by rotation of planet gears 19, to the pressure chambers 44. At this point, teeth 19' intermeshing with the teeth 20' of the sun gear 20, cause the teeth to displace the liquid F, in the spaces between the teeth, and force it into pressure chambers 44, causing a rotary gear pump action to occur on the liquid F and urging the liquid F toward orifices 47. The orifices 47 and 48 are designed to permit free flow of the liquid F through the valves E, when completely open, at the maximum rate of flow caused by the pump action of the gear teeth 19' and 20', so as not to cause a pressure to be built in the pressure chambers 44, and hence allowing free unretarded rotation of planet gears 19 on their respective axes. The intermeshing teeth 19' and 20' may cause some of the liquid F to be locked in the spaces between the teeth, and a groove 50, see Fig. 2, in center plate 4, is so placed as to relieve this liquid F into pressure chamber 44. The apertures 35 should of course not fit the pinions 19 too closely on the suction side of the pinions to avoid suction that might retard the rotation thereof and this would obviously be avoided by suitable clearance on the walls of the apertures.

Provision is made so that the valve E controlling the circulation of the liquid F through the orifices 47 and 48 from the pressure chambers 44, may at the proper time be operated to progressively restrict the flow of liquid as described, so as to cause pressure to be progressively built up in pressure chambers 44, to retard the rotation of the planet gears on their shafts 24, by causing the liquid F to be wedged between the teeth 19' and 20'. Retarding rotation of the planet gears 19 on their respective shafts 24 causes revolution of the shaft 24 on the sun gear 20, and since the shafts 24 are mounted on the rotor housing A, the rotor housing A will be caused to rotate on the anti-friction bearings 6 and 7. When the circulation of the liquid F is ultimately completely cut off, the planet gears 19 will be completely stopped from rotating on the shafts 24, and the rotary motion will then be wholly transmitted through the rotor housing A, and the driven shaft 15 will be rotated at the same rate of speed as the drive shaft 16, resulting in a direct drive.

The process may be reversed by progressively opening the valve E until free circulation of the liquid F is again attained, permitting progressive increase in the rate of rotation of the planet gears 19 and decrease of revolution of the rotor housing A until the planet gears again rotate freely, and the rotor housing A again becomes stationary. It should be noticed that at no time is the transmission of rotary motion interrupted between the drive shaft 16 and the driven shaft 15; and that by varying the rate of liquid flow, a progressive variation of gear reduction is attained, ranging from the designed reduction of the gear train P, to unity, or direct drive through the rotor housing A, and vice versa. It may be desirable in certain instances to connect one or more units in series as shown in Fig. 1, coupled together by such coupling means as indicated at 52 and thereby providing the advantage of a series of the above described operations, with a succession of gear ratio reductions in cascade.

The control of liquid as described is effected by the valve E, and the valve E may be of any design to suit any particular application. The valve E in the instant embodiment, as shown in Figs.

3, 4, 5, 7, 10, 12 and 13, comprises a hollowed tapered body 54 fitted into a tapered bore machined into rotor housing section 3, on an axis parallel with the drive and driven shafts 16 and 15, the hollow body being open at the larger end 55 and lying close to the center plate 4; the smaller end having a stem 56 concentric with the tapered body 54 and extending through a journaled hole of rotor housing section 3, and terminating outside of rotor housing A. Extending transversely through the wall of the tapered body 54 and communicating with the hollow portion 55, are ports 47' and 48', registering with orifices 47 and 48 respectively in the rotor housing section 3, when the valves E are completely open. As the valves are rotated, and the ports 47' and 48' move out of registration with the orifices 47 and 48 respectively, the circulation of the liquid F is restricted or throttled, and pressure is caused to build up in pressure chambers 44, and similarly in the hollow portions 55 of the valves E, and the pressure seats the tapered bodies 54 in the tapered bores of rotor housing section 3 and produces a liquid tight fit at the valves.

It may be advisable to make the orifices 47 slightly larger than the orifices 48 so that the entire pressure in pressure chambers 44 will be communicated to the hollow portions 55 of the valves E when the orifices 48 are completely closed and the orifices 47 not quite closed.

Preferably the valves E are operated automatically. Various means may be provided for such automatic control, such as governors on the drive shaft 16 or driven shaft 15, or by variable torque-responsive devices coupling the shafts and controlling the valves E; but I prefer to provide the means illustrated in Figs. 3, 5, 7, 9, 12 and 13. On the stems 56 of the valves E, are mounted gear segments 58, see Fig. 7, fixed thereto by keys 59. The gear segments 58 are in constant mesh with a gear-toothed member 60, mounted concentric with rotor housing A, see Fig. 5, and rotatable on the hub 11. Toothed member 60 has two outwardly extending arms 61, and, integral therewith, angular portions 62, extending into rotor housing A, see Fig. 10. Integral with the angular portions 62, are webbed portions 63, extending into the arc-shaped cavities 49, parallel with the center plate 4. Integral with or fixed to the webbed portions 63 are wall-plates 64 lying in radial planes with respect to the center of the rotor housing A, and forming movable walls in the arc-shaped cavities 49 opposite the orifices 48 and forming enclosed spaces 65 therein, see Fig. 3.

Liquid F, flowing from the orifices 48, into the spaces 65, by the pump action of the planetary gear train P, above described, will cause pressure therein to move the wall-plates 64 over the machined wall surfaces of the arc-shaped cavities 49 around the center of gear tooth member 60, see Figs. 12 and 13, causing the gear segments 58 interlocking with members 60 to rotate, and the same being fixed to the tapered bodies 54 of valves E, cause the valves E to rotate toward closed position.

More liquid F may be advantageously allowed to flow through the orifices 48 than enough to just fill the spaces 65, and to this end the openings 66 in wall-plate 64 (see Fig. 9) are proportioned to permit an escape from the spaces 65 and to cause the pressure in spaces 65 to build up at a rate depending on the size of the openings 66, and the rate of flow of the liquid F.

To provide for closing of valve E at a definite predetermined rate of rotation of planetary gear train P, I provide a pressure closing valve H, see Fig. 9. This valve comprises a cup-shaped member 68, pressed into a hole 69 concentric with hole 66, the cup-shaped member 68 protruding into the space 65. A hole is provided in the top of cup-shaped member 68, and holes 71 in the circumference exposing within a spring 72 extending into the hole 69 and abutting at one end upon the wall-plate 64 and extending into the cup-shaped member 68 and abutting at the other end upon a disk 73 retained by the cup-shaped member 68. A tubular member 74 pressed into hole 66 forms, at the top, a seat for the disk 73. Liquid F freely flows through the valve H when the valve E is open until such time as pressure is created in space 65 sufficient to overcome the spring 72 and cause the disk 73 to be moved toward and seated on the tubular member 74, and restricting the circulation of liquid F from the spaces 65 and building therein a progressive pressure that causes the wallplate 64 to move through the desired arc length of movement until wall-plate 64 is moved into the position approaching that shown in Figs. 12 and 13.

The minimum opening from the spaces 65 into the arc-shaped cavities 49 should be of such size as to permit a free flow of liquid F up to a predetermined rate of flow less than the maximum rate of flow effected by the pumping action of the intermeshing teeth 19' and 20'. Therefore the openings in valves H should be smaller than the orifices 48, so that at a predetermined rate of free circulation of liquid F, occurring when the planetary gear train P overcomes the torque resistance on the driven shaft 15, the circulation of liquid F will be restricted in spaces 65 and cause the pressure to be built up therein to seat the disk 73 on the tubular member 74 and cause the pressure in spaces 65 to increase rapidly and actuate the wallplate 64 and connecting members to move the valves E toward closed position.

It is preferred to control the rate of movement of wallplate 64 so as to effect a smooth retarding of the planetary gearing P, and this can be accomplished by permitting the pressure in spaces 65 to build up at a predetermined rate after the valve H is closed, such as by providing a predetermined rate of leakage from the space 65, and such leakage may be provided by the opening 75 in the disk 73, to suit the desired conditions.

The above described operation will turn the valve bodies 54 until the valves E are just closed or nearly closed, see Figs. 3 and 12, and the closing of the valves E shuts off liquid F from entering the spaces 65. It may be desirable to close the valves E more completely and this can be done in various ways. In the instant embodiment, see Figs. 5 and 13, I show radially extending arms 77 integral with gear segments 58 with weights 78 thereon. As the valves E are rotated by the above explained operation causing rotor housing A to rotate, the pivoted weights 78 move away from the axis of the rotor housing A by centrifugal force acting thereon, in such direction as to tend to close the valves E, and, at a predetermined speed, act centrifugally to completely rotate the valve-bodies 54 to full closed position, see Fig. 12 and Fig. 13.

To regain the original position of the wall-plates 64, weights 78, valves E and connecting members, I provide a spring 80, see Fig. 1, having one end fastened in the hub 11 and the other end fastened in gear toothed member 60 and tending to rotate member 60, see Fig. 5, and connecting parts in the direction to open the valves E until angular portion 62 engages the rotor housing wall at 81, see Fig. 10, and causes it to stop thereon. The valves E will be opened by the spring 80 when the rotor housing A comes to rest or is slowed down by the addition of torque resistance on driven shaft 15.

Arc segments 83, see Figs. 12 and 13, set into the vertical wall of rotor housing section 3, retain the wall-plate 64, in the arc-shaped cavity 49 when the valves are completely closed. The gear toothed-member 60, the arms 61 and connecting members integral therewith including wall-plate 64, can be made of one piece if desired and assembled in place and so retained by the arc-segment 83 which is fastened in place by screws 84.

Liquid F is introduced into housing G through holes such as 85, and plugged by threaded plugs 86, as shown in Fig. 2; and similar plugs 87 are provided at the bottom, see Fig. 1, for draining off the liquid when desired. When air is used instead of liquid as will be referred to, vents may be provided in the housing G.

The liquid F as used in the present instance, is preferably a lubricant, such as one of the various lubricating oils, which also acts to lubricate the moving parts. The housing G, see Fig. 1, is provided with oil retaining rings 88 and 89, and a fluid storage sump 90 is provided having openings 91 and 92 connecting the housings in such manner as to permit the liquid F to have a common level.

The liquid F is free to enter between the vertical walls in sections 2 and 3 of rotor housing A, through the openings 93 as shown in Fig. 3, and openings 94 as shown in Fig. 6, respectively. The center plate 4 is cut out at 95, see Fig. 2, to permit liquid to pass from section 3 to section 2 freely. A depending wall 96, at the outer circumference of the opening 94 together with the arc segment 83 forms a channel 97 U-shaped in cross-section, see Fig. 3A, which retains the liquid F therein by centrifugal force when the rotor housing A starts to rotate. These channels 97 are connected by a common channel so as to permit the liquid F to distribute itself equally in the channels 97 so that dynamic balance will be maintained. In the instant embodiment, the common channel is in the form of an annular under-cut 98, see Fig. 1, passing just outwardly of the planet pinions 18 and connecting channels 97 together by a common conduit path M. The holes 39 of the inlet channels 38 communicate with this conduit path M, see Fig. 4, and are continuously covered by the liquid F as the rotor housing A starts rotating. The liquid F is caused to flow through the holes 39, into inlet channels 38, see Fig. 3, by the pump action of the gear teeth 19' and 20', and to the pressure chambers 44, through the opened valves E into the arc-shaped cavities 49, and back to the annular conduit path M, in a continuous cycle, to effect complete circulation of liquid F.

When the rotor housing A is stationary and rotary motion is transmitted through the planetary gear train P, liquid F, see Fig. 4, lies in the housing G, and in the rotor housing A, up to the level governed by the plugged holes 85, see Fig. 2. The liquid F will be forced by the sun gear 17 into the conduit path M in a circular swirl, in the clockwise direction, as shown in Fig. 4. Near the planet pinions 18 at the zone indicated by 99, the conduit path M is restricted to the size of the undercut 98, and the planet gears 18 at these zones moving counter-clockwise, move the liquid F back into zone 99 causing the liquid F to accumulate at the zone 99 for supplying the inlet holes 39. This action decreases as the rotor housing A starts to rotate causing the liquid F by centrifugal force to fill the channels 97 up to the depth permitted by the depending wall 96 and the arc segment 83, see Fig. 3A, and completely covering the inlet holes 39 and causing pressure therein and helping the one-way valve D to restrict any liquid escape from the pressure chambers 44.

The liquid F in the pressure chambers 44, when the valves E are completely closed, see Fig. 12, has no means of escape since the sun gear 20 and planet gears 19 are completely enclosed in the rotor housing A. The only possible leakage of liquid F, see Fig. 1, would be at the place where drive shaft 16 is journaled in the hub 11, and to overcome this a packing gland 100 may be provided; and packing may also be provided at the planet gears 19, on hollow shafts 21, where as shown, hardened washers 101 are disposed on each side of the planet pinions 19, and covering packing material 102 in circular recesses. Upon assembling, the tightening of the shafts 24 on the rotor housing A between the heads 25 and nuts 26 will cause the packing material 102 to be compressed and form a liquid tight fit on the hollow shaft 21.

The liquid F as described above is confined to pressure chambers 44, where the pressure wedges the liquid F between the meshing teeth 19' and 20' at an increasing rate, causing the planet gears 19 to be retarded, and to be ultimately locked to rotate with sun gear 20. If however, there should be any leaking of liquid F from the pressure chambers 44 when the valves E are completely closed, the result would be that the pressure would be decreased by such leakage and cause the gears 19 to continue to rotate somewhat, which would result in a creeping of the planet gears 19 on the sun gear 20 depending on the amount of the leakage. This creeping of the planet gear 19 would in most instances be negligible and in such cases the packing gland 100 and packing material 102 may not be required. However, at all times, regardless of the amount of leakage of liquid F, there will always be a continuous transmission of rotary motion between drive shaft 16 and driven shaft 15.

In the above description, as illustrated in Fig. 3, the sun gear 20 and the associated meshing planet gears 19 are used as a rotary pump, and as illustrated in Fig. 4, the sun gear 17 and the associated meshing planet gears 18, are not so used. The sun gear 17 and associated planet pinions 18 can be similarly constructed to function as a rotary pump, and the pressure chamber 44 may be extended into rotor housing section 2. Such modified construction may be desirable in transmitting larger units of power because less pressure will be required in pressure chambers 44 to retard the planet gears 18 and 19.

In the foregoing I have described my invention as using liquid. In various embodiments of my invention, for use with various types of machines and under various conditions, other fluids may be preferable. For example, high speed units may require a gas, such for example as air, having the characteristic of being compressible, and hence requiring a higher number of revolutions of the planetary gear train P before the proper compression is formed in pressure chamber 44 to retard the rotation of the planet gears 19. Liquids may be preferable in low speed units, in which the change-over to direct drive is required in a smaller number of revolutions of sun gear 20.

It may be desirable in some cases to provide mechanical means for connecting the drive shaft 16 directly to the driven shaft 15 after the valves E have been completely closed and the speed of driven shaft 15 approaches the speed of the drive shaft 16. In Figs. 14 to 18 inclusive, I have illustrated another form of my invention having such characteristics.

Rotor housing A, planetary gear train P, valves E, and other associated parts are similar to those described above, and have the same reference characters.

The rotor housing A may be completely closed, and in this instance is hermetically sealed so that liquid F is confined to the rotor housing, as a self-contained unit, and the liquid has a complete conduit path M for free circulation as described above; hence the vertical walls of rotor housing sections 2 and 3 will not have the holes 94 and 95. Threaded plugs 105, see Fig. 15, tapped in the vertical wall of rotor housing A provide for adding liquid F; and these plugs are vented if air is used as the fluid.

The valves E are operated by a link 106, connected to a lever 107 fastened on a stub shaft 108, see Figs. 14 to 17, which is in turn fastened to a forked lever 109 inside the housing G' having aligned inwardly extending trunnions 110 on a common axis passing through the center of a collar 111, and fitting into an annular groove 111' in collar 111, in such manner as to permit the collar 111 to freely revolve, and to be moved longitudinally. Collar 111 is slidably mounted on hub 11', and has integral longitudinally projecting cams 112, engaging similar cams 113 integral with a gear-toothed member 114 rotatably mounted on the hub 11'. When the collar 111 is urged toward the rotor housing A, by action of cams 112 acting on cams 113, the gear-toothed member 114 is rotated clock-wise, and gear toothed member 114, being in constant mesh with gear segments 115 mounted on stems 56 of the valves E, will cause the valves E to close. Spring 116 urges the collar 111 away from the rotor housing A, to cause the valves E to open, and has a tendency to rotate the gear member 114 in the counter-clockwise direction. This construction constitutes a simple form of control for the valve E, and which may be manual or automatic depending on what type of actuating means is connected to the link 106.

Mounted between the hub 11' and the drive shaft 16 is a clutch member 117, splined on the hub 11' at 118, and free to slide longitudinally, permitting drive shaft 16 to revolve freely therein. On clutch member 117, see Fig. 18, are clutch teeth 119, which are in engagement with teeth 120 on a stationary clutch member 121, fixed to drive shaft 16 by any suitable means such as by press fit splines. A pin 122 press fitted in collar 111, and into clutch member 117 and passing through elongated slots 123 in hub 11' provide for longitudinal movement of the clutch member 117 upon longitudinal movement of the collar 111, while permitting rotation of the collar 111 and clutch member 117 relative to the hub 11'.

In operation, upon shifting the collar 111, for example manually, the valves E are controlled; and when valves E are completely closed, a further movement of the collar 111 by the same mechanism continues to move clutch member 117 into engagement with stationary clutch member 121, meshing their respective clutch teeth 119 and 120. This locks the hub 11' so that it is rotatable with the drive shaft 16, transmitting rotary motion to the driven shaft 15 in direct mechanical connection through rotor housing A to drive shaft 16. This mechanical engagement is made without shock, since the valves E by the arrangement described, must be completely closed before teeth 119 engage teeth 120.

The results of this mechanical connection may be effected by making a mechanical connection at other places in the rotor housing A between any two moving parts, since a direct connection between any two of the moving members in rotor housing A will cause the planet shafts 24 to rotate with sun gear 20. The operating means need not be a linkage such as that described; to effect the same end result, fluid pressure from chamber 44 may be used to actuate directly or indirectly a movable mechanical connecting member, or the movement of the weights 78 or similar weights may be used to actuate a mechanical member such as member 117; for example as shown in one form in Figs. 24 to 25, and in another form in Figs. 26 to 28 inclusive.

Figs. 24 and 25 illustrate the use of fluid pressure to effect a positive mechanical connection between the drive and driven shafts 16 and 15 respectively; and Figs. 26 to 28 inclusive illustrate the use of centrifugal force to effect a similar connection.

The construction in these figures is in general similar to the construction illustrated in Figs. 1 to 13 inclusive. Referring to Figs. 24 and 25 a clutch member 160 is splined to drive shaft 16 and is movable longitudinally thereon, and has radial beveled teeth 161 on one end engageable with similar teeth 162 on a clutch member 163 which is fastened to and rotatable in unison with the rotor housing A. A spring 164 abutting upon the clutch member 160 and upon a collar 165 on the shaft 16, tends to hold the clutch member 160 out of engagement with the clutch member 163 and permits relative rotation of drive shaft 16 with respect to the rotor housing A.

The clutch member 160 has an annular piston 160A reciprocable in an annular fluid chamber 166, and the system may have a packing ring 167 fastened to it to seal the piston in the chamber 166.

Valves E' one of which is shown, are provided and these may be similar to and operated as are the valves E of the form of Figs. 1 to 13. These valves have each an inlet 47' admitting liquid to the valves and an outlet 48', the latter being disposed to entirely close before the ports 47'; and have each a port 169 which, upon rotary movement of the valves E' opens at about the time the port 48' closes. A passage 168 leads from the chamber 166 to the port 169. The port 48' cuts off the escaping fluid from the chamber 44 and the ports 47' and the port 169 supply fluid under pressure from the chamber 44 through the passage 168 to the chamber 166. When the planetary gear train P has approached the condition of maximum retardation, the gears move at slow relative velocity sufficient to pump the fluid into the passage 168 and chamber 166 and this pushes the piston outwardly in the chamber 166 and moves the clutch member 160, overcoming the spring 164 and engaging the teeth 161 with the teeth 162 to make a positive mechanical connection between the drive shaft 16 and the driven shaft 15, the effect of which is the same as described above for the clutch 117—121 of Fig. 14.

If desired the valves E' may be rotated farther by the action of centrifugal force on a weight or weights such as the weights 78, as explained in connection with Figs. 1 to 13, to completely seal the fluid in the passage 168 and chamber 166 by completely cutting off the liquid flow at the ports 47' but holding the pressure in the chamber 166, thereby holding the clutch member 160 in clutch-engaged position. When the transmit power from the drive shaft 16 decreases; or when load resistance on the drive shaft increases, the weights 78 return toward their original positions, as explained hereinbefore and rotate the valves E' in the return direction. When the ports 169 register with passages 168, the fluid pressure in the chamber 166 is relieved through the passages 168 and ports 169 and 47' and the spring 165 moves the clutch member 160 out of engagement with clutch member 163. Since fluid is now again being pumped, the pressure in chamber 44 cushions the transition from drive through the positive connections drive through the planetary gear train P.

The form of Figs. 26 and 28 inclusive is similar to that of Figs. 24 and 25 but here a clutching member 160a has radial pins 170 pressed into or similarly fastened thereto, and extending through elongated slots 170a in a hub 11a on the rotary housing A. The pins engage cams 171, Fig. 28, having each a flat portion 172 and a cam surface 173, cut into an angular flange 174 on the toothed member 60a.

As valve E is actuated as described in connection with the form of Figs. 1 to 13, the pin 170 idles along the flat portion 172 of the cam 171, permitting the valve E to take up the position approaching complete retardation of rotary motion of the planetary train P, this position being illustrated in Fig. 28. At this position of the pin the clutch teeth 161 and 162 are rotating at equal or at approximately equal speeds, so that engagement of the teeth may be effected without shock. The gear-toothed member 60a continues to be rotated by the gear segments 58 and the action of centrifugal force as explained hereinbefore, acting on the weights 78, moves the cam surface 171 causing pins 170 to ride up on the cam surfaces 173 and move the member 160a forward to engage the teeth 161—162. The clutch teeth are thus engaged at a predetermined rotary speed of the rotor housing governed by the weights 78 and the spring 80, effecting a direct positive mechanical connection from drive shaft 16 to driven shaft 15.

The direct positive mechanical connection illustrated in Figs. 14 to 18 and in another form in Figs. 24 and 25 and in another form in Figs. 26 to 28 inclusive will at no time permit engagement of the clutch teeth until the planetary gear train approaches the completely retarded condition, and will disengage as soon as the valve E starts to turn in the return direction to restore circulation of fluid.

In the above description of my invention I have disclosed a differential planetary gear train of a specific type and arrangement of gears; but in the following described third embodiment, it will be apparent to those skilled in the art, that my invention may be applied to most any type and arrangement of differential gear train.

In the third embodiment of my invention, illustrated in Figs. 19 to 23, similar parts have the same reference characters as those of the previous embodiments, with the following differences. The planetary gear train P' consists of a ring gear 125, having internal teeth mounted on a drive shaft 15, by means of a spider 126, splined on the drive shaft 15; and fastened by such means as screws 127 to ring gear 125. Ring gear 125 is in constant mesh with a plurality of planet gears 128 rotatably mounted on stub shafts 129 fixed in rotor housing A', and in constant mesh with a sun gear 130, having a hub 131 rotatably mounted on the driven shaft 16. Rotor housing A' consists of two sections 132 and 133 respectively, clamped together with a center section 134 by bolts 135, to form an enclosure for the planetary gear train P'. This rotor housing A' is rotatably fixed upon driven shaft 16 by such means as a pin 136, and is mounted to rotate on anti-friction bearings 137 and 138 in the general housing G''.

Hub 131 has, on its outer end, a one-way brake for locking the planetary gear train P' to operate in one direction only, see Fig. 23, similar to the one-way braking mechanism of the first described embodiments and comprising a plurality of steel balls 28' equally distributed around the circumference of the hub 131 and retained at equal distances by a retaining ring 139 having holes therein for the balls 28' to rotate freely. Balls 28' fit into cam grooves 140 on the inside circumference of a ring 141. Ring 141 is fastened to general housing G'' by bolts 142. The cam grooves are so formed as to have a clearance with the balls 28' and hub 131, to permit free rotation of the hub 131 in the clockwise direction, and to cause this clearance to decrease, by the proper slope of cammed surfaces 140, between cam grooves 140, the balls 28' and the hub 131, when the hub 131 tends to rotate in the counter-clockwise direction whereby it is locked against counter-clockwise rotation.

Rotary motion, transmitted from the drive shaft 15 in clockwise direction of rotation, turns the ring gear 125 in the same direction, transmitting rotary motion to the planet gears 128 in the clockwise direction. The gears 128 then tend to turn the sun gear 130 in the counter-clockwise direction, but since sun gear 130 is locked against turning in that direction, there will be a revolution of the shafts 129, carrying planet gears 128, in the clockwise direction, causing the rotor housing A' to turn in the clockwise direction; and the shafts 129 fixed therein cause driven shaft 16 to rotate and in the instant embodiment, with a reduction gear ratio.

The valves E are similar to those of the above described embodiments. In this particular gear arrangement unit, a chamber 143 in the inside wall of housing A' is provided to receive liquid F which may be entrapped by the meshing teeth of the ring gear 125 and planet pinions 128, and conduits such as grooves 144 lead such liquid into pressure chambers 44. Liquid F in pressure chambers 44 confined therein by closing the valves E, causes pressure of the liquid F to be increasingly wedged between the teeth of sun gear 130 and planet gears 128, and also between the planet gears 128 and the ring gear 125, at chambers 143, thereby retarding the rotation of planet gears 128 on the shafts 129, and causing decreased rotation of planet gears 128 on shafts 129, and an increased revolution of the shafts 129 with ring gear 125, until the planet gears 128, fixed to ring gear 125 and sun gear 130, rotate effecting a direct connection between drive shaft 15 and the driven shaft 16.

Packing glands 145 can be made on angular flanges 146 of the rotor housing A" and having a machined running fit with annular projections 147 of the ring gears 125, trapping the liquid F in the rotor housing A". A packing gland 148 may also be provided between the rotor housing A" and the hub 131 of sun gear 130. An annular conduit path 149 is formed by the inwardly extending walls 150 of spider 126, and the inwardly extending walls 151, see Fig. 22, of the rotor housing section 133, making an enclosed conduit path for the liquid F, from the outlet orifices 48 of the valves E, to the inlet orifices 39, similarly as described for the first above described embodiment.

The operation of the valves E is the same in this instance as in the second described embodiment, being effected by a collar 152, keyed to the hub 11'. The mechanical direct connection has not been illustrated for this embodiment.

While I have illustrated and described my invention in connection with differential gearing of the planetary type, utilizing spur gears, it is to be understood that it may be practiced with differential gearing of the type utilizing bevel gears; for example as illustrated in Figs. 29 to 33.

In these figures the drive shaft 16 is integral with a tubular hub member 175 having an angular flange 176 fastened to a rotor housing 177 by studs or bolts 178. The rotor housing 177 consists of an inner portion 179 having apertures therein to receive bevel gears 180—181 and bevel pinions 182. The pinions 182 have hubs 183 journaled in plates 184 bolted to the inner portion 179. Similarly gear 181 has a cover 185 bolted to the housing 177, and the flange 176 encloses gear 180 closing the rotor housing 177. The cover 185 has a hub 186 in which is journaled a hub 187 of the gear 181 the hub extending outside of the housing 177. Mounted on the hub 187 is a one-way braking device 188 similar to that explained in connection with Fig. 23 hereinbefore, which acts to permit rotation of the gear 181 only in the clockwise direction as viewed from the left.

The drive shaft 15 is journaled in the hub 187 and is integral with the gear 180. The rotor housing 177 is mounted to rotate freely on antifriction bearings 189 and 190.

Within the hub member 175 is a positive mechanical connection similar to that described in the form of Figs. 14 to 18 and comprises a movable clutch member 191, splined to the wall of the tubular hub 175 and movable longitudinally to engage with a clutching member 192 integral with the gear 180; and these movements may be effected by mechanism similar to that for engaging the clutch of the form of Figs. 14 to 18 and is so illustrated and need not be further described.

The flange 176 has an annular conduit path 193 for a purpose similar to that of the annular conduit path 149 of Figs. 19 and 22 and has inlet holes 39 to the one-way valve D. The means for moving the valve E may be similar to that of the form of Figs. 14 to 18.

The pressure chamber 200 in this instance (corresponding to the pressure chamber 44 hereinbefore described), due to the difference of gear construction, is in the inner portion 179, Figs. 31 and 32, and communicates directly with the enlarged open end of the valve body 201. A port 202 in each of the valve bodies 201 registers, when the valve E is fully open, with an orifice 203 leading to the annular conduit path 193; hence there is a complete path of fluid from the inlet hole 39, the fluid being carried by gear 180 to the point of meshing with pinions 182, Fig. 31, thence to pressure chamber 200, through valve bodies 201, through ports 202, through orifices 203, and back to the annular conduit path 193.

Rotary motion of drive shaft 15 is transmitted through the gear 180, and rotating pinions 182, and since the gear 181 is held from rotating counter-clockwise, tends to rotate the rotor housing 177 in a clockwise direction with the driven shaft 16 secured thereto, at a reduced rate of rotation, and a corresponding increased torque. The transition of rotary motion from a reduced ratio to a direct positive drive, is the same as explained in the above forms.

My invention as described hereinbefore may be applied to various uses. For example, it may be used as a speed change transmission between the clutch and propeller shaft of an automobile. In this instance, the gear reduction ratio through the differential gearing would be such as to correspond to the gear reduction ratio of the usual gear shift transmission at low speed. In this use of my invention when the automobile clutch is engaged the vehicle will be started at the usual low speed gear ratio and as the vehicle speeds up and reaches a predetermined speed, the fluid pumping action above described will begin to be effective and the gear reduction will be gradually and automatically removed; and finally the vehicle will be driven directly without gear reduction.

Conversely, the transmission ratio will automatically and gradually be changed to a gear reduction ratio in the event that the vehicle slows down as when climbing a hill.

Again, the transmission above described may be utilized to perform the functions of a clutch between any driven element and driving element, to start the driven element from rest and bring it up to speed without shock, particularly when the load being driven has considerable inertia.

Again, the transmission above described may be utilized to perform the functions of a brake to slow down a load being driven.

In all applications of my invention, whether functioning as a power transmission, as a clutch, or as a brake, the gradual change of speed effected between the driving and driven elements or shafts occurs without the employment of frictionally engaged parts, the transition of drive from gear ratio to direct drive, or vice versa, being brought about by the fluid pumping action of the intermeshed differential gears.

In numerous respects, as will be apparent, my invention is not limited to the exact details of construction illustrated and described. Changes and/modifications may be made, without departing from the spirit of my invention and without sacrificing its advantages, and my invention is comprehensive of all such modifications and changes which come within the scope of the appended claims.

I claim:

1. In a power transmission, a driving and a driven rotary shaft, interconnected through a differential gearing mechanism comprising rotatable meshed gears, a brake on an element of the differential mechanism to prevent its rotation in one direction to thereby cause the driving shaft to drive the driven shaft by the gears at a predetermined gear ratio, fluid disposed to be pumped by meshed teeth of gears of the differential mechanism to thereby exert a pump load braking action on the pumping gears, and means to variably control the rate of pumped fluid flow to variably control the pump load braking action, to variably control the ratio of transmission.

2. In a power transmission, a driving and a driven rotary shaft, interconnected through a differential gearing mechanism comprising rotatable meshed gears and pinions, a brake on an element of the differential mechanism to prevent its rotation in one direction to thereby cause the driving shaft to drive the driven shaft by the gears at a predetermined gear ratio, fluid disposed to be pumped by meshed teeth of the gears of the differential gearing mechanism to thereby exert a pump load braking action on the pumping gears, means to variably control the rate of pumped fluid flow to variably change the pump load braking action to variably change the ratio of transmission.

3. In a power transmission, a driving and a driven rotary shaft interconnected through a differential gearing mechanism comprising a rotor housing for the rotatable meshed gears and pinions, a one-way brake automatically effective with the rotor housing to prevent rotation in a direction to cause the driving shaft to drive the driven shaft by the gears at a predetermined gear ratio, a quantity of fluid, a fluid conduit path in said rotor housing, means for causing the fluid to be pumped into the conduit path by rotation of a pinion to thereby brake rotation of the pinion by the pumping load and means to variably control the rate of pumped fluid flow to variably control the pump load braking action to variably control the ratio of transmission.

4. In a differential power transmission, a differential mechanism comprising a pair of differential gears, pinions meshed with the gears, a drive shaft connected to one gear, a driven shaft connected to the other gear, a rotor-housing for said pinions and a one-way brake on the rotor-housing to prevent its rotation in a direction whereby power is transmitted from one shaft to the other at a predetermined gear reduction ratio effected by relative rotation of the gears and pinions, a fluid conduit path in said rotor housing containing fluid disposed to be pumped therethrough by the meshed tooth engagement of the gear and pinion to exert a tooth pressure pump load braking action on the pinions, a valve for throttling the fluid flow, to progressively increase the pump load braking action to thereby progressively reduce the gear reduction ratio of transmission to substantially one-to-one ratio.

5. In a differential power transmission, a differential mechanism comprising a pair of differential gears, pinions meshed with the gears, a drive shaft connected to one gear, a driven shaft connected to the other gear, a brake on an element of the differential mechanism to prevent its rotation in a direction whereby power is transmitted from one shaft to the other by the gears at a predetermined gear ratio of transmission, effected by relative rotation of the gears and pinions, a fluid conduit path containing fluid disposed to be pumped therethrough by the meshed teeth engagement of a rotative gear and pinion to exert a tooth pressure pump load braking action on the pinions, a valve for throttling the fluid flow, means to close the valve to progressively increase the tooth pressure pump load to progressively retard relative rotation of the pinions to thereby progressively reduce the ratio of transmission.

6. In a power transmission, a driving and a driven rotary shaft, interconnected through a differential gearing mechanism comprising rotatable meshed gears, a brake on an element of the differential gearing mechanism to prevent its rotation in a direction to thereby cause the driving shaft to drive the driven shaft by the gears at a predetermined gear ratio, fluid disposed to be pumped by meshed teeth of gears of the differential mechanism to thereby exert a pump load braking action on the pumping gears, and means to control the rate of pumped fluid flow to control the pump load braking action, to thereby control the ratio of transmission, said means being operable responsive to the pressure of the pumped fluid.

7. In a differential power transmission, a drive shaft, a first differential gear driven thereby, a second differential gear and a driven shaft driven thereby, pinions meshed with both gears, a brake on an element of the differential mechanism to prevent its rotation in a direction whereby the drive shaft may drive the driven shaft by the gears and pinions at a predetermined gear reduction ratio, fluid disposed to be pumped by the teeth of the gear and pinion meshed engagement, at pressure commensurate with the speed of the driven shaft, to thereby exert a pump load braking action on the pumping pinions, means for controlling the flow of pumped fluid to increase the pump load to retard rotation of the pinions and to change the ratio of transmission, said means comprising valve means operable by the fluid pressure.

8. In a power transmission, a driving and a driven rotary shaft, interconnected at predetermined gear ratio through a differential gearing mechanism comprising a rotatable meshed gear and pinion and a one-way brake on an element of the differential mechanism, a quantity of fluid disposed to be pumped under pressure by rotation of the meshed gear and pinion, and movable means responsive to a predetermined pumped fluid pressure for progressively controlling the flow of pumped fluid to progressively increase the fluid pressure, to progressively brake rotation of the pinion.

9. In a differential power transmission, a pair of differential gears, pinions meshed with the gears, a drive shaft connected to one gear, a driven shaft connected to the other gear, a brake on an element of the differential mechanism preventing its rotation in a direction whereby power is transmitted from one shaft to the other at a predetermined gear reduction ratio effected by relative rotation of the gears and pinions, a fluid conduit path containing fluid disposed to be pumped therethrough by the gear and pinion rotation, a valve for throttling the flow, means to progressively close the valve operable by pumped fluid, to progressively increase the fluid pressure at the gears and pinions to progressively brake rotation of the pinion to thereby progressively reduce the degree of gear reduction of the transmission.

10. In a power transmission, a driving and a driven rotary shaft, interconnected through a differential gearing mechanism comprising rotatable meshed gears, a brake on an element of the differential gearing mechanism to prevent its rotation in a direction to thereby cause the driving shaft to drive the driven shaft by the gears at a predetermined gear reduction ratio, fluid disposed to be pumped by rotation of the gears of the differential mechanism to exert a braking action thereon, and means to control the rate of pumped fluid flow to control the braking action, to control the ratio of transmission from the gear reduction ratio to substantially one to one ratio, said means being operable responsive to the pressure of the pumped fluid, and operable means to positively connect the driving and driven shafts when at said one to one ratio.

11. In a power transmission, a driving and a driven rotary shaft, interconnected through a differential gearing mechanism comprising rotatable meshed gears, a brake on an element of the differential mechanism to prevent its rotation in a direction to thereby cause the driving shaft to drive the driven shaft by the gears at a predetermined gear reduction ratio, fluid disposed to be pumped by rotation of the gears of the differential mechanism to exert a braking action thereon, and means to control the rate of pumped fluid flow to control the braking action, to control the ratio of transmission from the gear reduction ratio to substantially one to one ratio, and operable means to mechanically lock the power transmitting differential gears when at said one to one ratio.

12. In a power transmission, a driving and a driven rotary shaft, interconnected through a differential gearing mechanism comprising rotatable meshed gears, a brake on an element of the differential mechanism to prevent its rotation in a direction to thereby cause the driving shaft to drive the driven shaft by the gears at a predetermined gear reduction ratio, fluid disposed to be pumped by rotation of the gears of the differential mechanism to exert a braking action thereon, and means to control the rate of pumped fluid flow to control the braking action, to control the ratio of transmission from the gear reduction ratio to substantially one to one ratio, and means to positively connect the driving and driven shafts when at said one to one ratio, said positively connecting means being responsive to pressure of the pumped fluid.

13. In a power transmission, a driving and a driven rotary shaft, interconnected through a differential gearing mechanism comprising rotatable meshed gears, a brake on an element of the differential mechanism to prevent its rotation in a direction to cause the driving shaft to drive the driven shaft by the gears at a predetermined gear reduction ratio, fluid disposed to be pumped by rotation of the gears of the differential mechanism to exert a pump load braking action thereon, means to control the rate of pumped fluid to control the pressure attained thereby to control the pump load braking action to thereby control the ratio of transmission from the gear reduction ratio to substantially one-to-one ratio, means to positively connect the driving and driven shafts when at said one-to-one ratio operable responsive to the attainment of a predetermined pressure.

14. In a power transmission, a driving and a driven shaft, interconnected through a differential gearing mechanism comprising a rotary housing, rotatably supporting pinions and rotatable gears meshed with the pinions, a one-way brake automatically effective with the rotor housing to prevent its rotation in a direction to cause the driving shaft by the gears to drive the driven shaft at a predetermined gear reduction ratio, fluid disposed to be pumped by rotation of the gears of the differential mechanism to exert a pump load braking action thereon, means to control the rate of pumped fluid flow to control the pump load braking action to control the ratio of transmission from the gear reduction ratio to substantially one-to-one ratio, means to positively connect the driving and driven shafts when at said one-to-one ratio, and a centrifugal device for operating the positively connecting means responsive to a predetermined speed attained by the rotary housing.

15. In a power transmission, a driving and a driven shaft, a rotary member associated with the driven shaft to drive it, and rotatably supporting a pinion, a gear connected to the driving shaft and meshed with the pinion, a quantity of fluid, a fluid conduit path, means for causing the fluid to be pumped into the conduit path by rotation of the pinion to thereby retard rotation of the pinion by the pumping load to cause the rotary member and the driven shaft to be rotated, means operable responsive to the pressure of the pumped fluid to control the flow of pumped fluid to increase the pump load braking action to increase the speed of the rotary member and driven shaft to substantially that of the driving shaft and means to positively mechanically connect the driving shaft and driven shaft when at substantially the said speed.

16. In a power transmission, a driving and a driven shaft, a rotary member associated with the driven shaft to drive it, and rotatably supporting a pinion, a gear connected to the driving shaft and meshed with the pinion, a quantity of fluid, a fluid conduit path, means for causing the fluid to be pumped into the conduit path by rotation of the pinion to thereby retard rotation of the pinion by the pumping load to cause the rotary member and the driven shaft to be rotated, means to control the flow of pumped fluid to increase the pump load braking action, responsive to a predetermined pumped load, to increase the speed of the rotary member and driven shaft to substantially that of the driving shaft and means to positively mechanically connect the driving shaft and driven shaft when at substantially the said speed.

17. In a power transmission, a driving and a driven shaft, interconnected through a differential gearing mechanism comprising rotatable meshed gears, a brake on an element of the differential mechanism to prevent its rotation in a direction to thereby cause the driving shaft to drive the driven shaft by the gears at a predetermined gear ratio, fluid braking means co-acting with the gears of the differential mechanism to control the ratio of transmission from the predetermined gear ratio to substantially one to one ratio, operative means to positively lock the power transmitting meshed gears when at substantially one to one ratio.

18. In a power transmission, a driving and a driven shaft, a rotary member associated with the driven shaft to drive it, and rotatably supporting a pinion, a gear connected to the driving shaft and meshed with a pinion, a quantity of fluid, a fluid conduit path, means for causing the fluid to be pumped into the conduit path by rotation of the pinion to thereby retard rotation of the pinion by the pumping load to cause the rotary member and the driven shaft to be rotated, means to control the flow of the pumped fluid to increase the pump load braking action to increase the speed of the rotary member and driven shaft to substantially that of the driving shaft and means to positively mechanically connect the driving and driven shaft at substantially the same speed, operable responsive to the attainment of a predetermined fluid pressure.

19. In a power transmission, a driving and a driven shaft, a rotary member associated with the driven shaft to drive it, and rotatably support a pinion, a gear connected to the driving shaft and meshed with the pinion, a quantity of fluid, a fluid conduit path, means for causing the fluid to be pumped into the conduit path by the rotation of the pinion to thereby retard rotation of the pinion by the pumping load to cause the rotary member and the driven shaft to be rotated, means to control the flow of pumped fluid to increase the pump load braking action to increase the speed of the rotary member and driven shaft to substantially that of the driving shaft and means to positively mechanically connect the driving and driven shaft when at substantially the same speed, and a centrifugal device for operating the positive connecting means responsive to a predetermined speed transmitted.

20. In a power transmission, a power drive shaft, a driven shaft, a differential gearing mechanism comprising relatively rotatable pinions, a pinion-carrier for the pinions and a one-way brake thereon for transmitting drive shaft power to the driven shaft at a predetermined gear ratio of transmission effected by relative rotation of the pinions in the differential gearing mechanism, means providing an orifice, a quantity of fluid disposed to be pumped by the rotating pinions through the orifice, at pressure commensurable with the pinion rotary velocity, means operating responsive to a predetermined fluid pressure to progressively retard the pumped fluid and to correspondingly brake the rotation of the pinions to progressively change the ratio of transmission.

21. In a differential power transmission, a drive shaft, a first differential gear driven thereby, a second differential gear and a driven shaft driven thereby, pinions meshed with both gears, a pinion-carrier for said pinion and a one-way brake on the pinion-carrier to prevent its rotation in a direction whereby the drive shaft may drive the driven shaft by the gears and pinions at a predetermined gear reduction ratio, fluid disposed to be pumped by meshed teeth of a gear and pinion at pressure commensurable with the speed of the driven shaft, to thereby exert a pump load braking action on the said pinion, means for throttling the flow of pump fluid to increase the pump load to retard rotation of the pinions and to change the ratio of transmission, said throttling means comprising valve means operable upon the attainment of a predetermined pressure only.

22. In a differential power transmission, a drive shaft, a first differential gear driven thereby, a second differential gear and a driven shaft driven thereby, pinions meshed with both gears, a pinion-carrier for said pinions and a one-way brake thereon to prevent rotation in a direction whereby the drive shaft may drive the driven shaft by the gears and pinions at a predetermined gear ratio, a quantity of fluid, a fluid conduit path, means for causing the fluid to be pumped into the conduit path by meshed teeth engagement of a rotative gear and pinion to thereby brake rotation of the pinion by the pumping load, the pumped fluid attaining a pressure commensurable with the speed of the driven shaft, means for controlling the flow of pumped fluid to increase the tooth pressure load braking action to retard rotation of the pinion and to change the ratio of transmission.

23. In a differential power transmission, a drive shaft, a first differential gear driven thereby, a second differential gear and a driven shaft driven thereby, pinions meshed with both gears, a pinion-carrier for said pinions and a one-way brake thereon controlling its rotation in a direction whereby the drive shaft may drive the driven shaft by the gears and pinions at a predetermined gear ratio, a quantity of fluid, a fluid conduit path, means for causing the fluid to be pumped into the conduit path by rotation of the pinions to thereby brake rotation of the pinion by the pumping load, the pumped fluid attaining a pressure commensurable with the speed of the driven shaft, means for throttling the flow of pumped fluid to increase the pump load braking action to retard rotation of the pinion and to change the ratio of transmission, said means comprising valve means operable by the fluid pressure.

24. In a differential power transmission, a drive shaft, a first differential gear driven thereby, a second differential gear and a driven shaft driven thereby, pinions meshed with both gears, a pinion-carrier for said pinion and a one-way brake thereon controlling its rotation in one direction whereby the drive shaft may drive the driven shaft by the gears and pinions at a predetermined gear ratio, a quantity of fluid, a fluid conduit path, means for causing the fluid to be pumped into the conduit path by rotation of the pinions to thereby brake rotation of the pinion by the pumping load, the pumped fluid attaining a pressure commensurable with the speed of the driven shaft, means for throttling the flow of pumped fluid to increase the pump load braking action to retard rotation of the pinion and to change the ratio of transmission, said means comprising valve means operable by the fluid pressure upon the attainment of a predetermined pressure only.

25. In a differential power transmission, a differential mechanism comprising a pair of differential gears, pinions meshed with the gears, a drive shaft connected to one gear, and a driven shaft connected to the other gear, a brake on an element of the differential mechanism to prevent its rotation in a direction whereby power is transmitted from one shaft to the other at a predetermined gear reduction ratio of transmission effected by relative rotation of the gears and pinions, fluid disposed to be pumped by gear and pinion meshed engagement to effect a pump load braking action on the pinions, a valve for throttling the flow of pumped fluid, means operable by the pumped fluid to progressively move the valve toward closed condition, and rotary means responsive to the action of centrifugal force to subsequently move the valve to substantially closed condition, whereby progressive throttling of the fluid flow progressively increases the pump load braking action and progressively reduces the gear reduction ratio to substantially a one-to-one ratio.

26. In a power transmission, a driving and a driven rotary shaft, interconnected through a differential gearing mechanism comprising rotatable meshed gears, a brake on an element of the differential mechanism to prevent its rotation in one direction only to cause the drive shaft to drive the driven shaft by the gears at a predetermined gear ratio, a pumping means coacting with said rotatable meshed gears, fluid disposed to be pumped by said pumping means to thereby exert a pump load braking action on the rotatable meshed gears, and means to variably control the rate of pumped fluid flow to variably control the pump load braking action, to variably control the rate of transmission, and a rotary container in which fluid tends to accumulate by the action of centrifugal force thereon, and means to conduct the fluid from the container to said pumping means.

27. In a differential power transmission, a differential mechanism comprising a pair of differential gears, pinions meshed with the gears, a drive shaft connected to one gear, a driven shaft connected to the other gear, a brake on an element of the differential mechanism to prevent its rotation in a direction whereby power is transmitted from one shaft to the other at a predetermined gear reduction ratio of transmission, a fluid conduit path containing fluid disposed to be pumped therethrough by rotary gear and pinion engagement to exert a pump load braking action on the pinions, a valve for throttling the fluid flow, means to progressively close the valve to progressively increase the pump load to progressively retard relative rotation of the pinions to thereby progressively reduce the ratio of transmission, and an annular rotary container in which the fluid tends to accumulate by the action of centrifugal force thereon, and an inlet from the container to said fluid conduit path.

28. In a power transmission, a driving and a driven rotary shaft interconnected through a differential gearing comprising rotatable meshed gears and pinions, a rotor housing enclosing the gears and pinions, a one-way brake continuously controlling said rotor housing to cause the driving shaft to drive the driven shaft at a predetermined gear ratio, a quantity of fluid, a fluid-conduit path, means for causing the fluid to be pumped through the conduit path by rotation of a pinion to thereby brake rotation of the pinions by the pumping load and means to variably control the rate of pumped fluid flow to variably control the pump load braking action to variably control the ratio of transmission, said fluid conduit path being an annular path in said rotor housing in which the fluid tends to accumulate by the action of centrifugal force thereon for dynamical balance of the fluid in the rotor housing.

29. In a power transmission, a driving and a driven rotary shaft, interconnected through a differential gearing mechanism comprising rotatable meshed gears, a brake on an element of the differential mechanism to prevent its rotation in one direction to thereby cause the driving shaft to drive the driven shaft by the gears at a predetermined gear ratio, fluid disposed to be pumped by meshed teeth of the differential gearing to thereby exert a pump load braking action on the pumping gears, a valve to variably throttle the rate of pumped fluid flow to variably change the pump load braking action to variably change the ratio of transmission, said valve being a rotary valve with an annular tapered body on a tapered valve seat and disposed to be subjected to pumped fluid pressure to be maintained firmly seated on the valve seat by said pressure.

30. In a power transmission, a driving and a driven shaft, a rotary member rotatably supporting a pinion, a gear fixed to the driving shaft and meshed with a pinion, a second gear meshed with the pinion, a one-way brake preventing rotation of the second gear in one direction to cause the drive shaft to drive the driven shaft by the gears at a predetermined gear ratio, a quantity of fluid, a fluid conduit path, means for causing the fluid to be pumped into the conduit path by rotation of the pinion to thereby retard rotation of the pinion by the pumping load to cause the rotary member and the driven shaft to be rotated, means to control the flow of pumped fluid to increase the pump load braking action to increase the speed of the rotary member and driven shaft to substantially that of the driving shaft.

31. In a power transmission, a driving and a driven rotary shaft, interconnected through a differential gearing mechanism comprising rotatable meshed gears, to cause the driving shaft to drive the driven shaft at a predetermined gear ratio, fluid disposed to be pumped by meshed teeth of the gears of the differential gearing to thereby exert a pump load braking action on the pumping gears, means to variably control the rate of the pumped fluid flow to variably change the pump load braking action to variably change the ratio of transmission and a peripheral surface on the differential gearing mechanism, a plurality of rolling members on this surface, stationary cam surfaces co-acting with the rolling members to prevent rotation of the differential gearing mechanism in one direction only.

32. In a power transmission, a driving and a driven rotary shaft, interconnected through a differential gearing mechanism comprising rotatable meshed gears, to cause the driving shaft to drive the driven shaft at a predetermined gear ratio, fluid disposed to be pumped by the meshed teeth of the gears of the differential gearing to thereby exert a pump load braking action on the pumping gears, means to variably control the rate of pumped fluid flow to variably change the pump load braking action to variably change the ratio of transmission and a peripheral surface on the differential gearing mechanism, a plurality of rolling members on this surface, stationary cam surfaces co-acting with the rolling members, a retaining means for the rolling members in respect to the cam surfaces to cause simultaneous contact thereon to equally distribute the load thereon to prevent rotation of the differential gearing mechanism in one direction only.

HARRY ORNER.